United States Patent
Woodward et al.

(10) Patent No.: US 9,904,782 B2
(45) Date of Patent: Feb. 27, 2018

(54) SYNCHRONOUS EXECUTION OF DESIGNATED COMPUTING EVENTS USING HARDWARE-ASSISTED VIRTUALIZATION

(71) Applicants: Carl D. Woodward, Santa Clara, CA (US); Jennifer Mankin, San Jose, CA (US); Dmitri Rubakha, Santa Clara, CA (US); Palanivel Rajan Shanmugavelayutham, San Jose, CA (US); Vadim Sukhomlinov, Santa Clara, CA (US)

(72) Inventors: Carl D. Woodward, Santa Clara, CA (US); Jennifer Mankin, San Jose, CA (US); Dmitri Rubakha, Santa Clara, CA (US); Palanivel Rajan Shanmugavelayutham, San Jose, CA (US); Vadim Sukhomlinov, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 143 days.

(21) Appl. No.: 14/924,493

(22) Filed: Oct. 27, 2015

(65) Prior Publication Data
US 2017/0116419 A1 Apr. 27, 2017

(51) Int. Cl.
*G06F 21/54* (2013.01)
*G06F 12/10* (2016.01)
(Continued)

(52) U.S. Cl.
CPC .............. *G06F 21/54* (2013.01); *G06F 9/542* (2013.01); *G06F 12/10* (2013.01); *G06F 21/52* (2013.01);
(Continued)

(58) Field of Classification Search
CPC ........ G06F 21/52; G06F 21/54; G06F 21/566; G06F 2221/034; G06F 12/10
See application file for complete search history.

(56) References Cited

U.S. PATENT DOCUMENTS

2005/0108562 A1* 5/2005 Khazan ............... G06F 11/3604
726/23
2013/0185792 A1* 7/2013 Balakrishnan .......... G06F 21/54
726/22

(Continued)

OTHER PUBLICATIONS

L. Davi et al. "ROPdefender: A Detection Tool to Defend Against Return-Oriented Programming Attacks," ASIACCS ' 11, Mar. 22-24, 2011. pp. 40-50.*

*Primary Examiner* — Robert Leung
(74) *Attorney, Agent, or Firm* — Blank Rome, LLP (57) ABSTRACT

Providing synchronous processing of the designated computing events using hardware-assisted virtualization technology by performing at least the following: detecting a designated computing event using a high priority, low capability routine, creating a copy code in an alternate memory space of a first code located in a first memory space, modifying the copy code to call for analysis of at least a portion of the copy code that corresponds to the first code, switching execution of the first code with the modified copy code using an address translation data structure that translates a guest memory address to a host memory address after a return of the high priority, low capability routine; and analyzing synchronously the at least a portion of the code within the copy code that corresponds to the first code based on the replacement of the first code with the modified copy code.

25 Claims, 6 Drawing Sheets

(51) Int. Cl.
*G06F 21/52* (2013.01)
*G06F 9/54* (2006.01)
*G06F 21/56* (2013.01)

(52) U.S. Cl.
CPC ...... *G06F 21/566* (2013.01); *G06F 2212/657* (2013.01); *G06F 2221/034* (2013.01)

(56) References Cited

U.S. PATENT DOCUMENTS

| | | | | |
|---|---|---|---|---|
| 2015/0186296 A1* | 7/2015 | Guidry | ............... | G06F 21/54 713/193 |
| 2015/0379263 A1* | 12/2015 | Vipat | ............... | G06F 21/79 726/23 |
| 2016/0179546 A1* | 6/2016 | Yamada | ............... | G06F 21/54 712/240 |

\* cited by examiner

SYNCHRONOUS EXECUTION OF DESIGNATED COMPUTING EVENTS USING HARDWARE-ASSISTED VIRTUALIZATION

TECHNICAL FIELD

Embodiments described herein generally relate to processing computer instructions using hardware-assisted virtualization technology, and in particular for dynamically converting typical asynchronous processing of designated computing events, such as security events that are detected in high-privilege, low capability routines to synchronous processing of the designated computing events using hardware-assisted virtualization technology.

BACKGROUND ART

Computing malware, such as computer viruses, worms, and Trojans are a common and growing concern that plague today's computing systems. Malware is typically designed to perform a variety of intrusive functions that include, but are not limited to disrupting computer operations, gathering personal and confidential information, and/or gaining access to private computing systems. To perform these intrusive functions, malware is generally encoded to exploit vulnerabilities and/or security lapses within the software (e.g., operating systems and web browsers) of a computing system. For example, malware, such as malware based on return-oriented programming, may utilize a buffer overrun vulnerability to execute the malware instructions. Unfortunately, as today's industries and societies maintain their reliance on computing devices and network-based technologies (e.g., the Internet), the proliferation of malware continues to flourish.

To protect today's information systems, computing systems are often equipped with computing applications, such as anti-malware that attempt to provide countermeasures from malware attacks. Anti-malware is able to reduce vulnerability and harm from malware attacks by providing real-time preventive protection and/or removal of potential malware code. Providing real-time preventive protection often involves filtering out harmful data received over a network (e.g., the Internet), scanning data files at the time of downloading, and/or blocking computing processes known to denote malware behavior. Although anti-malware technology continues to improve and mature, anti-malware applications still lack effective detection and processing of incoming security threats. Security breaches of protected electronic information persists within computing systems that range from individual consumer devices to protected computing systems used in the financial sector, government, and large corporations. As such, constantly improving the technology of detecting and processing of incoming security threats for computing systems remains valuable in providing computing security against evolving and unknown malware threats.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computing system" can refer to a single computing device that includes, but is not limited to a single computer, host, virtual machine (VM), server, network device, and/or mobile device, such as a smartphone, tablet, and/or other smart devices, or a plurality of computing devices working together to perform the function described as being performed on or by a computing system.

As used herein, the term "network device" refers to any computing system that is capable of communicating with another computing system across any type of network(s).

As used herein, the term "asynchronous" refers to the execution of computing instructions (e.g., threads, processes, stubs, codes, and/or programs) in a non-deterministic timeframe and/or thread context.

As used herein, the term "synchronous" refers to the execution of computing instructions (e.g., threads, processes, stubs, codes, and/or programs) in a deterministic timeframe and/or thread context.

As used herein, the term "high-privilege, low capability computing routines" refer to computing routines that process computing conditions determined as high priority such that the computing condition interrupts a processor's current execution of computing instructions. The routines implement a limited number of functions that are based on the purpose of the routine and are executed in relatively short processing time frame. The purpose of the limited number of functions could be for completing a specific computing task, recording specific computing information available at the time the routine executes, and/or scheduling or deferring further processing of the routine using another computing routine. The limited number of functions may be implemented as a callback that executes instructions in a variety of computing applications that include, but are not limited to hardware firmware (e.g., microcontroller firmware), hardware device drivers, and/or operating systems. Examples of high-privilege, low capability computing routines include Interrupt Service Routines (ISRs) on the Microsoft Windows and other first-level interrupt handlers for other Operating Systems (OSs), such as Linux, Unix, and Mac OSx.

As used herein, the term "low-privilege, high capability computing routines" refer to computing routines that process computing tasks deferred to by high-privilege, low capability computing routines and/or process computing tasks according to a queue such that the computing tasks remain in the queue until the processor is available. In other words, the tasks are scheduled similarly to other threads and processes executed by the processor and do not interrupt a processor's current execution of instructions. Examples of low-privilege, high capability computing routines include Deferred Procedure Call (DPCs) and Asynchronous Procedure Calls (APC) for Microsoft Windows, work-items, new threads, and second-level interrupt handlers for other OSs, such as Linux, Unix, and Mac OSx.

As used herein, the term "designated computing events" refer to computing events that based on one or more computing policies have been labelled as events that may be routed and executed to a high-privilege, low capability computing routine and subsequently processed synchronously. Non-limiting examples include security events and performance monitoring events.

Unless otherwise specified within the disclosure, the terms "memory space" and "memory view" may be considered synonymous. Also, as used herein, the term "memory space" may be implemented as blocks of memory, such as memory pages.

Disclosed herein are various embodiments that provide synchronous processing capabilities for designated computing events that are detected using high-priority, low capability routines within a computing system. In one embodiment, the synchronous execution may process security events detected in high-privilege, low capability routines to implement an inline security process that provides safe execution of the security events. A high-priority, low capability routine, such as Interrupt Service Routines (ISRs), may detect security events that the ISRs are unable to remediate and/or safely determine whether the security event is harmful to the computing system. Rather than processing the security events asynchronously by deferring the processing of the security event to a low privilege, high capability routine, the ISRs execute code located in an alternate memory space that comprises computing instructions associated with an analysis and remediation application. Specifically, address translation data structures may reference the alternate memory space that includes modified code from the original memory space. Rather than queuing the security for deferred processing, the code within the alternate memory space executes to call an analysis and remediation application. The analysis and remediation application may be configured to perform further analysis of the security event, and if necessary, remediate or terminate computing instructions relating to the securing event. In one embodiment, to reduce detectability, the use of the alternate memory space may be applicable for the specific computing instructions (e.g., a specific thread) that raised the security event, and other unrelated computing instructions (e.g., other thread contexts) may be unable to ascertain the alternate memory space.

Figure 1:
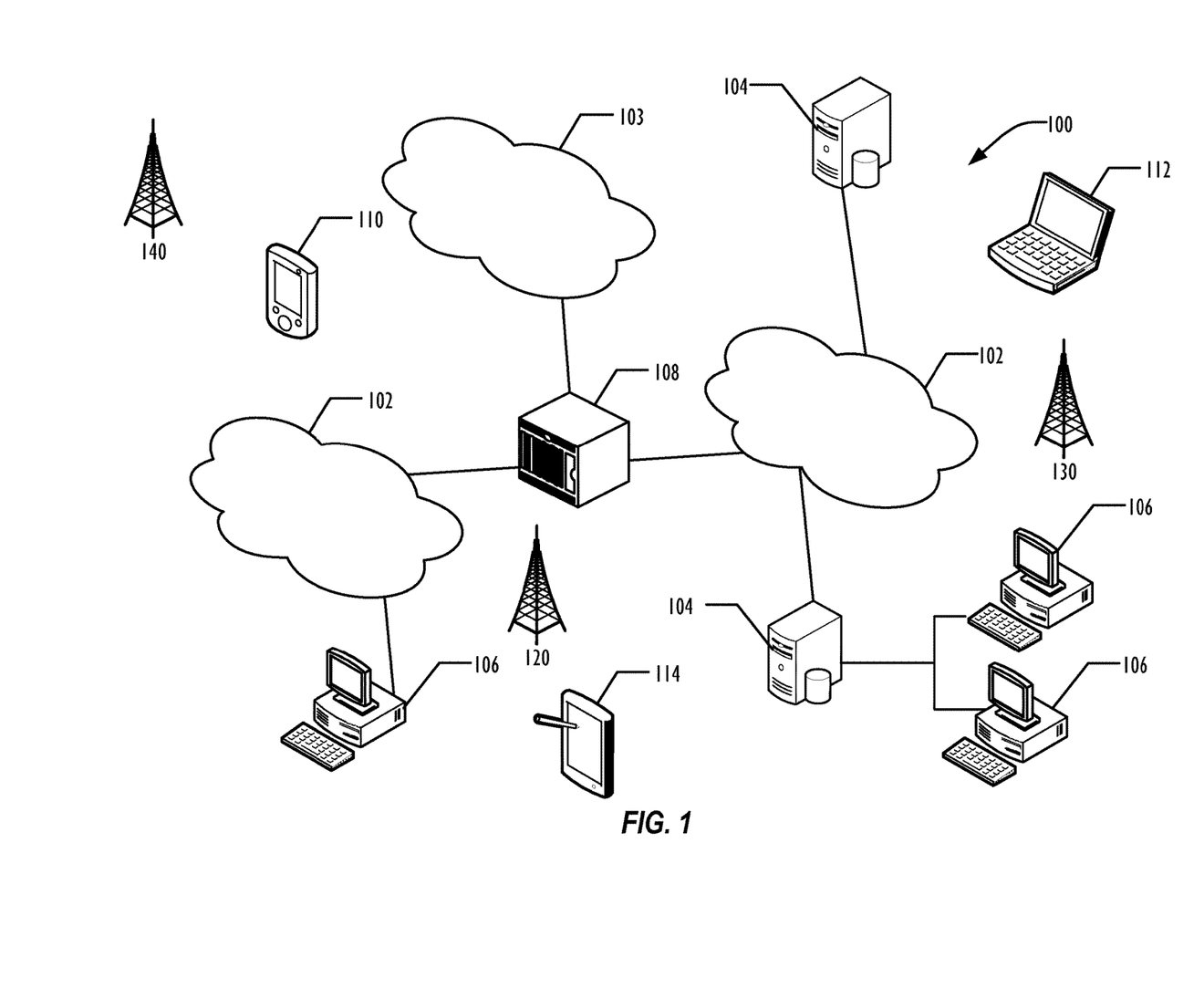
FIG. 1 is a schematic diagram of an embodiment of a network infrastructure where embodiments of the present disclosure may operate herein.

FIG. 1 is a schematic diagram of an embodiment of a network infrastructure 100 where embodiments of the present disclosure may operate herein. Network Infrastructure 100 comprises computer networks 102. Each of the computer networks 102 may contain a number of other devices typically referred to as Internet of Things (microcontrollers, embedded systems, industrial control computing modules, etc.). Specifically, computer networks 102 comprise one or more different types of computer networks available today, such as the Internet, a corporate network, a wide area network (WAN), and/or a local area network (LAN). Each of these networks within computer networks 102 may contain wired or wireless programmable devices and operate using any number of network protocols (e.g., TCP/IP) and may operate in the electrical and/or optical domain. For example, one or more the networks within computer networks 102 may be a wireless fidelity (Wi-Fi®) network, a Bluetooth® network, a Zigbee® network, and/or any other suitable radio based network as would be appreciated by one of ordinary skill in the art upon viewing this disclosure. The networks may also comprise switches, routers, and/or other network hardware devices to transport data over computer networks 102. Moreover, one or more of these networks may be configured as a virtual networks, such as virtual private network (VPN). FIG. 1 illustrates that computer networks 102 may be connected to end user computers 106, computer servers 104, and one or more network nodes 108, which include, but are not limited to gateways, routers, and/or wireless access points. Other embodiments of network infrastructure 100 may connect computer networks 102 to a variety of other computing device, such as VMs, hosts, storage devices, and/or any other electronic device capable of transmitting and/or receiving data over computer networks 102.

As shown in FIG. 1, network infrastructure 100 may also comprise a cellular network 103 for use with mobile communication devices. The cellular network 103 may be capable of supporting of a variety of electronic devices that include, but are not limited to computers, laptops, and/or a variety of mobile devices (e.g., mobile phones). Using FIG. 1 as an example, electronic devices in the network infrastructure 100 that communicate via the cellular network 103 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Although referred to as a cellular network 103 in FIG. 1, a mobile device may interact with towers of more than one provider network, as well as with multiple non-cellular devices such as network node 108. In addition, the mobile devices 110, 112, and 114 may interact with non-mobile devices such as computers 104 and 106 for desired services. The functionality of the network node 108 may be implemented in any device or combination of devices illustrated in FIG. 1; however, most commonly is implemented in a firewall or intrusion protection system in a gateway or router.

In one or more embodiments, one or more mobile devices 110, 112, and 114, computer servers 104, computers 106, and/or other electronic computing devices may support processing of designated computing events, such as security events. In one embodiment, the electronic computing devices may process the designated computing event asynchronously. High-privilege, low-capability routines may initially detect the designated computing events and based on the routines' capability performance, may be unable to remediate the designated computing event. In this instance, the high-privilege, low-capability routine may defer to a low privilege, high-capability routine, such as DPC, APC, work-items, and/or threads. Using FIG. 1 as an example, computers 106 could be running Microsoft Windows and generate an ISR that detects a security event originating from a return-oriented programming (ROP) attack. In certain instances, because the ISR does not have enough processing capability to determine whether the security event is an actual ROP attack and/or remediate the ROP attack, the ISR may subsequently queue a DPC to process the security event. In some instances, the DPC may be also unable to process the security event. For example, the DPC may be unable to call the applicable application program interfaces (APIs), and may then queue processing of the security event into a work-item. At this point, the computing instructions that raised the security event may resume and continue to execute such that the ROP attack succeeds. Once the ROP attack succeeds, the work-item that queued the processing of the security event may be able to document the ROP attack, but may be unable to remediate the security attack.

Rather than processing the designated computing event asynchronously by deferring the processing of the designated computing event to low priority, high capability routines, the mobile devices 110, 112, and 114, computer servers 104, computers 106, and/or other electronic computing devices may process the designated computing events in a synchronous manner. In a security event context, processing the security event synchronously avoids having the computing instructions that raised the security event from resuming and continuing to execute. To process the security event, the electronic computing devices may launch an analysis and remediation application located within an alternate memory space associated with an address translation data structure. The electronic computing devices may utilize an address translation data structure to perform hardware-assisted virtualization that map guest memory addresses (e.g., guest virtual address space) to host memory addresses (e.g., host physical address space). In one embodiment, the address translation data structures may be configured to perform a second-level address translation (SLAT), which is also known by persons or ordinary skill in the art as nested paging. Examples of address translation data structures that perform SLAT include Extended Page Tables (EPT) or Rapid Virtualization Indexing (RVI), which is also known by persons or ordinary skill in the art as nested page tables (NPT). The use of SLAT based virtualization reduces hypervisor overhead by storing the memory address within a processor, and thereby, reducing latency of the computing system by reducing the number of memory look-up operations when performing a virtual-to-physical address translation. Other embodiments could use software based virtualization that use shadow pages for address translation.

In a security event context, once a higher priority, but lower capability routine terminates, the electronic computing device replaces the original code that would normally execute after the termination of the routine with replacement code from the alternate memory space. The replacement code within the alternate memory space may comprise instructions based on the original memory space that have been modified to call out an analysis and remediation application in the original attack context. Once the analysis and remediation application finishes processing the original attack context, the original memory space is restored and the original code can continue to execute unless the analysis and remediation application terminated the thread. In one embodiment, the alternate memory space associated with the analysis and remediation application may be accessed for the computing instructions that caused the security event, while other computing instructions unrelated to the security event may not access the alternate memory space. By doing so, the analysis and remediation application avoids processing unnecessary computing instructions and reduces a malware's ability to detect the alternate memory space by temporarily replacing the computing instructions (e.g., a thread) that caused the security event.

Figure 2:
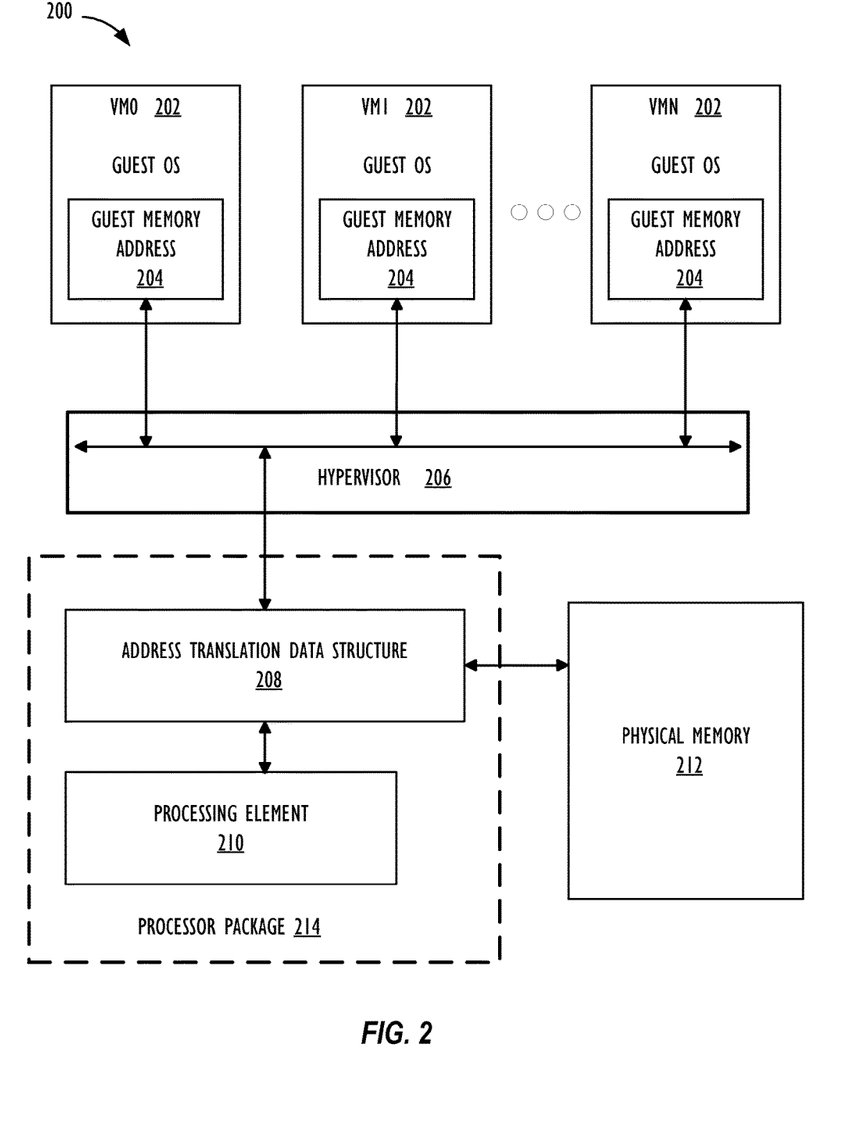
FIG. 2 is a schematic diagram of an embodiment of a computing system architecture configured to perform synchronous processing of designated computing events detected from high priority, low capability routines.

FIG. 2 is a schematic diagram of an embodiment of a computing system architecture 200 configured to perform synchronous processing of designated computing events detected from high priority, low capability routines. Using FIG. 1 as an example, the computing system architecture 200 may be one or more mobile devices 110, 112, and 114, computer servers 104, computers 106, and/or other electronic computing devices capable of connecting to computer network 102 and/or cellular network 103. As shown in FIG. 2, the computing system architecture 200 may comprises one or more VMs 202, where guest OS may be installed in each of the VMs 202 and allocated a guest memory address 204. The guest memory address 204 may be a virtual address space that the guest OS presents to applications running on the guest OS. In one embodiment, the guest OSs may be OSs installed in addition to the host or main OS of computing system architecture 200. Each of the VMs 202 appear to have its own processor, memory, drivers, and/or other computing resources.

The computing system architecture 200 may also comprise, a hypervisor 206, a processing element 210, and physical memory 212. The hypervisor 202 may be configured to create, run, and manage one or more VMs 202 on computing system architecture 200. Hypervisor 202 may allocate processor, memory, and other computing resources for each of the VMs and prevents the VMs from disrupting each other. In one embodiment, hypervisor 202 may be further configured to be compatible with a variety of hardware-assisted virtualization technologies such as EPT and RVI. The hypervisor 202 may also be configured to control the page tables associated with the hardware-assisted virtualization technologies. The processing element 210, which can also be generally referred to as the processor within this disclosure, is configured to execute one or more computing instructions (e.g., computer thread, stubs, process, code, and/or program) and/or other operations relating to performing a computing related-task. The physical memory 212 represents the host's physical memory used to store instructions, code, programs, and/or data information.

FIG. 2 also illustrates that the computer system architecture 200 may comprise an address translation data structure 208 that is configured to map the guest memory addresses to the host memory addresses. The address translation data structure 208 may provide address translation using page tables or translation lookaside buffers associated with a memory management unit (MMU). Persons of ordinary skill in the art are aware that the MMU may be part of a processor package and integrated with the processing element 210. In one embodiment, the address translation data structure 208 may be configured to implement SLAT to reduce hypervisor overhead by reducing the number of look-up operations performed by processing element 210. The address translation data structure 208 may use hardware virtualization extensions, such as EPT and/or RVI, to provide address translation without invoking the hypervisor to perform page mapping, such as shadow page mapping. The address translation data structure 208 may provide two levels of paging, where the first level of paging translates the guest virtual memory addresses to guest physical addresses and the second level of paging translates the guest physical address to a host physical address. In other words, the address translation data structure 208 considers the guest-physical address as a host virtual address such that a non-virtualized memory block (e.g., a guest page table) can walk a host memory block (e.g., a host page table). As hardware-assisted virtualization, the address translation data structure 208 may be integrated within the processor package 214 such that the memory address translation are stored on the processor package or integrated circuit.

Figure 3:
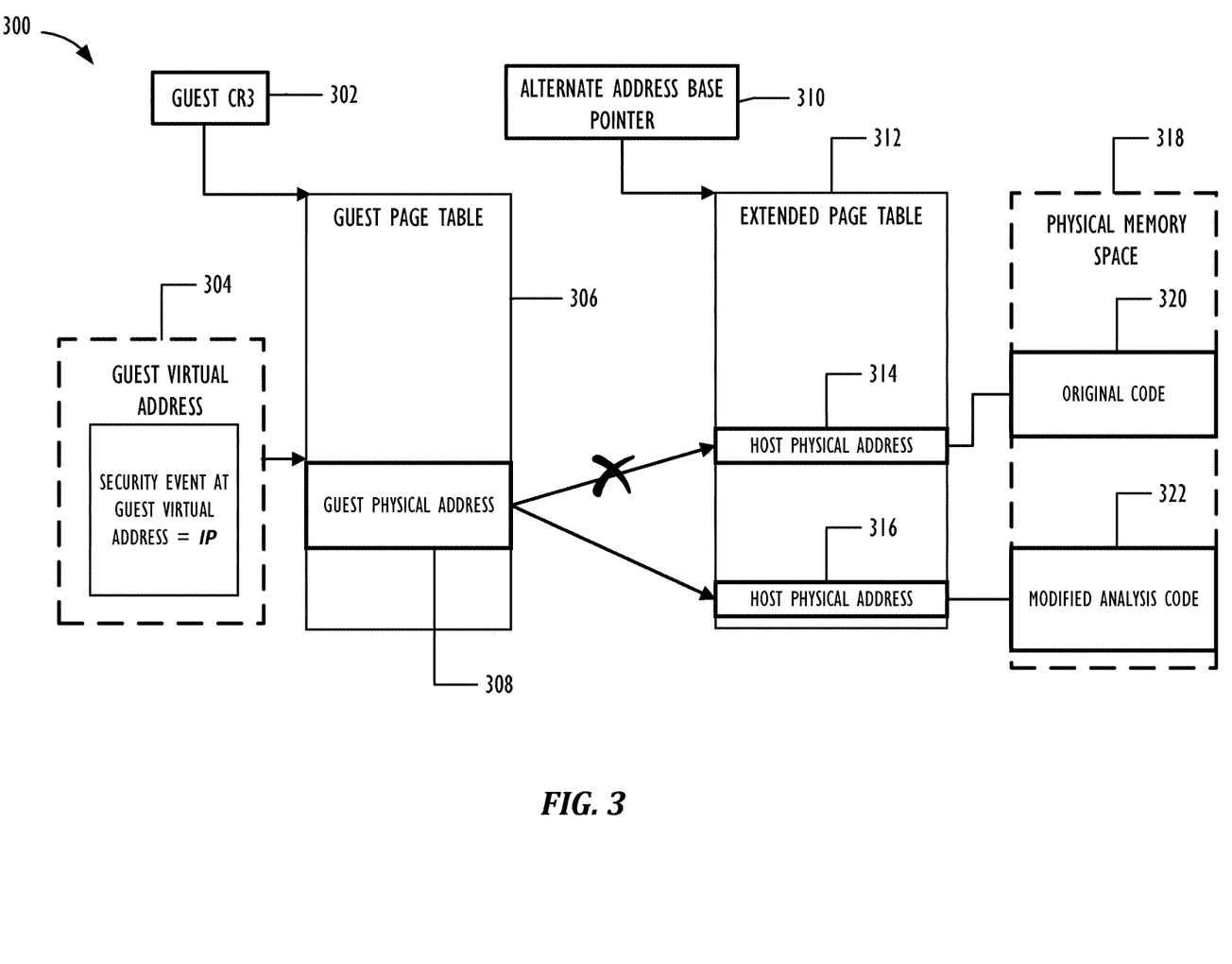
FIG. 3 is a flow diagram of an embodiment of an address translation process for accessing the alternate memory space using hardware-assisted virtualization.

Using FIG. 2 as an example, to perform synchronous processing of designated computing events detected from high priority, low capability routines that occurs in the guest OS of VM0 202, the hypervisor 206 may initially obtain the guest memory address from VM0 202 that references the code for execution. After receiving the guest memory address from VM0 202, the hypervisor 206 sends the guest memory address to address translation data structure 208 for address translation. During address translation, the address translation data structure 208 is configured to execute computing instructions located in an alternate memory space in the physical memory 212 rather than executing the computing instructions located in the original memory space. Specifically, address translation data structure 208 translates the guest memory address to an alternate host memory address that executes further processing of the code or jumps to an analysis application that processes the code that raised the designated computing event. In one embodiment, the analysis application the processes the code that raised the designated computing event could be a user or kernel mode analysis application. The processing element 210 may process code using the analysis application based on the alternate host memory address corresponding to the physical memory 212. Unless the analysis application determines to terminate the instructions in the original code, once the application finishes processing the code, the original code within the original memory space may be restored and the original code can continue to execute FIG. 3 is a flow diagram of an embodiment of an address translation process 300 for accessing the alternate memory space using hardware-assisted virtualization. Although FIG. 3 illustrates an address translation process 300 for a security event, the address translation process 300 may be applicable to other types of designated computing events. When a security event is detected, routing execution may be handled by the high priority, low capability routine, such as an ISR. The high priority, low capability routine may create a view copy of the original code 320 and subsequently modify the view copy of the original code 320 to create the modified analysis code 322 that calls for additional analysis and/or jumps to an analysis application when the high priority, low capability routine returns. The address translation data structure 312 may switch to translating the guest physical address 308 to host physical address 316 rather than host physical address 314 for the specific instruction(s) (e.g., the thread) that raised the security exception and not for unrelated instruction(s). By limiting the switch to translating the guest physical address 308 to host physical address 316, the resulting hook created using the address translation data structure 312 may not be implemented process, OS, and/or system wide.

FIG. 3 illustrates that a guest, such as a VM, may control the guest CR3 register 302 to point to the value containing the address of the page directory corresponding to a guest virtual address of a security event. The CR3 register 302 may correspond to a processor or central processing unit (CPU) register and can also be generally referred to as a page directory base register (PDBR). As shown in FIG. 3, the guest virtual address 304 of the security event may be an Internet Protocol (IP) address that references a corresponding guest entry in the guest page table 306. The guest entry may comprise the guest physical address 308. In one embodiment, the guest page table 306 may be about a 4096 byte page table that is divided into about 512 64-bit page entries.

An alternate address base pointer 310 (e.g., an EPT base pointer) may point to an address translation data structure 312 (e.g., an EPT table) that translates the guest physical address 308. FIG. 3 illustrates that when a high priority, low capability routine, such as an ISR, terminates, rather than having the address translation data structure 312 translate the guest physical address 308 to reference an entry with the host physical address 314, the address translation data structure 312 replaces the mapping of the guest physical address 308 to now references an entry with the host physical address 316. As shown in FIG. 3, the host physical address 316 references the modified analysis code 322 within the host physical memory space 318, while host physical address 314 references the original code 320 that would typically execute after execution of the termination of the high priority, low capability routine.

Figure 4:
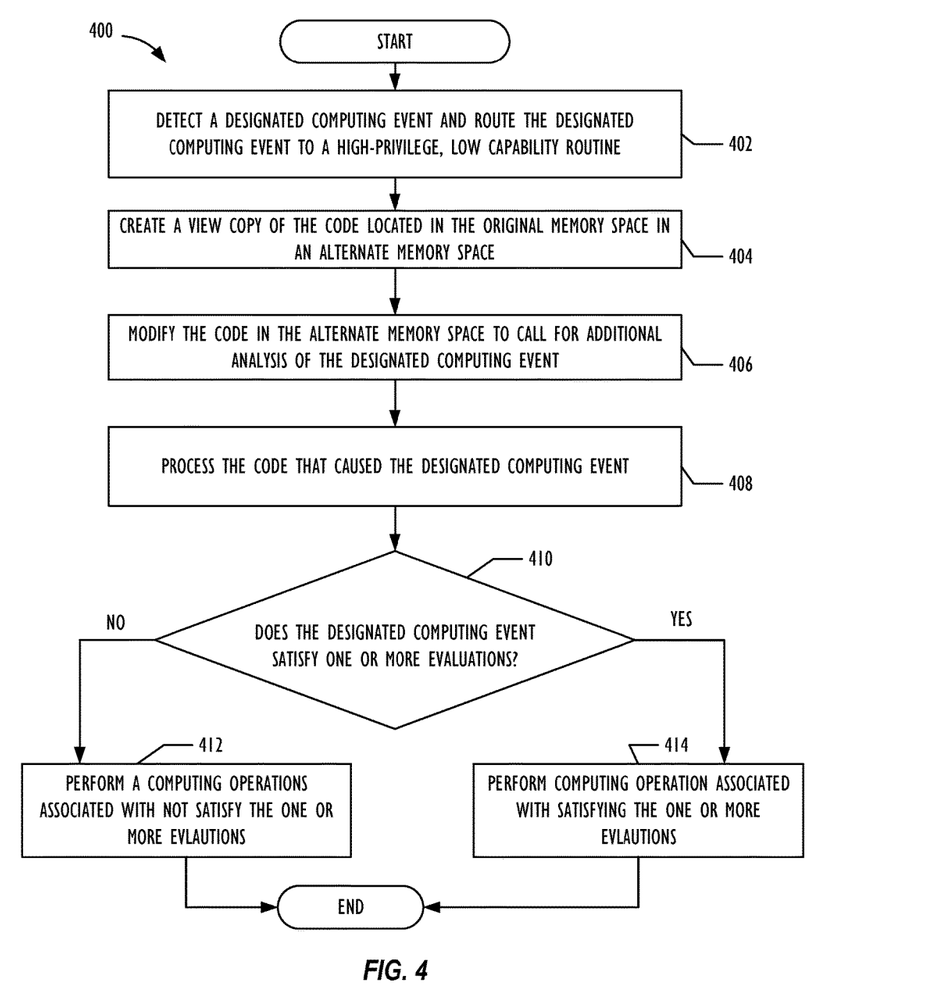
FIG. 4 is a flow chart of an embodiment of a method to synchronously process designated computing events detected from a high priority, low capability routine using hardware-assisted virtualization.

FIG. 4 is a flow chart of an embodiment of a method 400 to synchronously process designated computing events detected from a high priority, low capability routine using hardware-assisted virtualization. Using FIG. 1 as an example, method 400 may be implemented using the computing system architecture 200 and/or within be one or more mobile devices 110, 112, and 114, computer servers 104, computers 106, and/or other electronic computing devices capable of connecting to computer network 102 and/or cellular network 103. In a security event context, method 400 may employ a virtualized environment to execute, simulate, and/or analyze the code that triggered the security event. Method 400 may dynamically add protection, analysis, and/or heuristics without modifying or damaging the code within the original memory space using the virtualized environment. Method 400 may implement the virtualization using a hypervisor or virtual machine monitor (VMM). In one embodiment, the hypervisor or VMM may be implemented using at least some hardware components, such as portions of a processor, rather than using only software applications to create the hypervisor.

Method 400 may start a block 402 and detect a designated computing event and route the designated computing event to a high-privilege, low capability routine. The designated computing event may refer to any type of event that may designated as high priority by method 400. In one embodiment, the designated computing event may be a security event identified as a potential harm to a computing system, such as malware attack. Detecting a security event that could pose a potential harm to a computing system may be implemented using a variety of methods known by persons of ordinary skill in the art. For example, architectures for processors comprise a Performance Monitoring Unit (PMU) for monitoring selected events and plurality of registers for recording branches. Method 400 may use the PMU and registers (e.g., a last branch record (LBR) stack) in the processors to count branch mis-prediction events that may be caused by return and jump oriented programming exploits. The security event may be flagged after a return stack buffer mis-prediction raises an interrupt routine, such as an ISR.

Method 400 then moves to block 404 and creates a view copy of the code located in the original memory space in an alternate memory space. Using FIG. 3 as an example, the original memory space would be the location of the original code 320 and the alternate memory space would be the location of the modified analysis code 322 within the host physical memory space 318. Specifically, the view copy of the code in the alternate memory space comprises the code that caused the designated computing event. For a security event, the copy of the code includes the potentially-dangerous code that was flagged as a security event.

Method 400 then continues to block 406 and modifies the code in the alternate memory space to call for additional analysis of the designated computing event. In a security event context, method 400 may call for additional analysis of the security event and/or jump to an analysis and remediation application for further analysis. The enforcement of the code in the alternate memory space may be applicable to the computing instructions (e.g., the thread) that raised the security event and not to other unrelated computing instructions. For example, the code within the alternate memory space may be used in the context of the thread and the hook for the alternate memory space may not be process, OS, and/or system-wide detectable hooks. Limiting the enforcement of accessing the alternate memory space to computing instructions that caused the security event allows for the modification of code flow that increases the difficulty for malware to detect further analysis and/or remediation of the malicious code.

Method 400 may proceed to block 408 and process the code that caused the designated computing event. For a security event, using the alternate memory space, method 400 may perform additional analysis of the code that caused the designated computing event or jump to an analysis and remediation application for further processing. In one embodiment, method 400 may evaluate the code in the original context or environment of the instructions that the security event occurs in, such as in a user mode or in a kernel mode. For example, if the potential malware code would perform the attack in user mode, then method 400 would evaluate the code also in user mode. Persons of ordinary skill in the art are aware that a processor may switch between a user mode or a kernel mode depending on the type of code. For example, code for programming applications used in graphical user interface (GUI) may run in user mode while core OS components (e.g., handling interrupts) run in kernel mode. Moreover, in kernel mode, the executing code may have direct access to the underlying hardware, such as executing processor instructions and referencing physical memory addresses. In user mode, the executing code may be unable to access hardware directly, such as being unable to reference physical memory addresses.

Method 400 may continue to block 410 and determines whether the designated computing event satisfies one or more pre-defined parameters, functions, and/or evaluations. In a security event context, method 400 may determine whether the code that caused the security event is benign or non-malicious code. Specifically, at block 410, method 400 may use one or more detection algorithms known by persons of ordinary skill in the art to detect the malicious code. For instance, method 400 may employ signature-based detection that detect malware by comparing the code that caused the designated computing event to code and/or functions of known malware. Method 400 may also identify abnormal patterns or sequence of computing instructions that write to registers and/or memory addresses according to one or more templates that identify malicious computing behaviors or signatures. Also, method 400 may employ heuristic analysis to detect malware by monitoring malware type characteristics, such as branch discrepancies (e.g., return/call bias), return mis-predicts, and/or indirect branch mis-predicts.

Method 400 may then move to block 412 if method 400 determines the code that caused the designated computing event satisfies one or more pre-defined parameters, functions, and/or evaluations; otherwise, method 400 moves to block 414. At block 414, method 400 may perform a computing operation associated with satisfying the one or more pre-defined parameters, functions, and/or evaluations. In a security event context, method 400 may restore the code in the original memory space and execute a jump back instruction to resume processing of the original code.

At block 412, method 400 may perform a computing operation associated with not satisfying the one or more pre-defined parameters, functions, and/or evaluations. When detecting a security event, method 400, based on computing-policy based decisions, may repair and/or restore the code in the original memory space and subsequently jump back to resume the corrected code that caused the security event and/or terminate the current computing instruction (e.g., current thread) or a plurality of computing instructions (e.g., current process). For example, method 400 may determine as a computing policy to terminate the current computing instruction(s) rather than repairing or restoring the original memory code when the computing system is configured to perform relatively high security operations, continually access confidential information, and/or for other purposes that would rather remove false positives than being susceptible to security breaches and/or malware infections.

Figure 5:
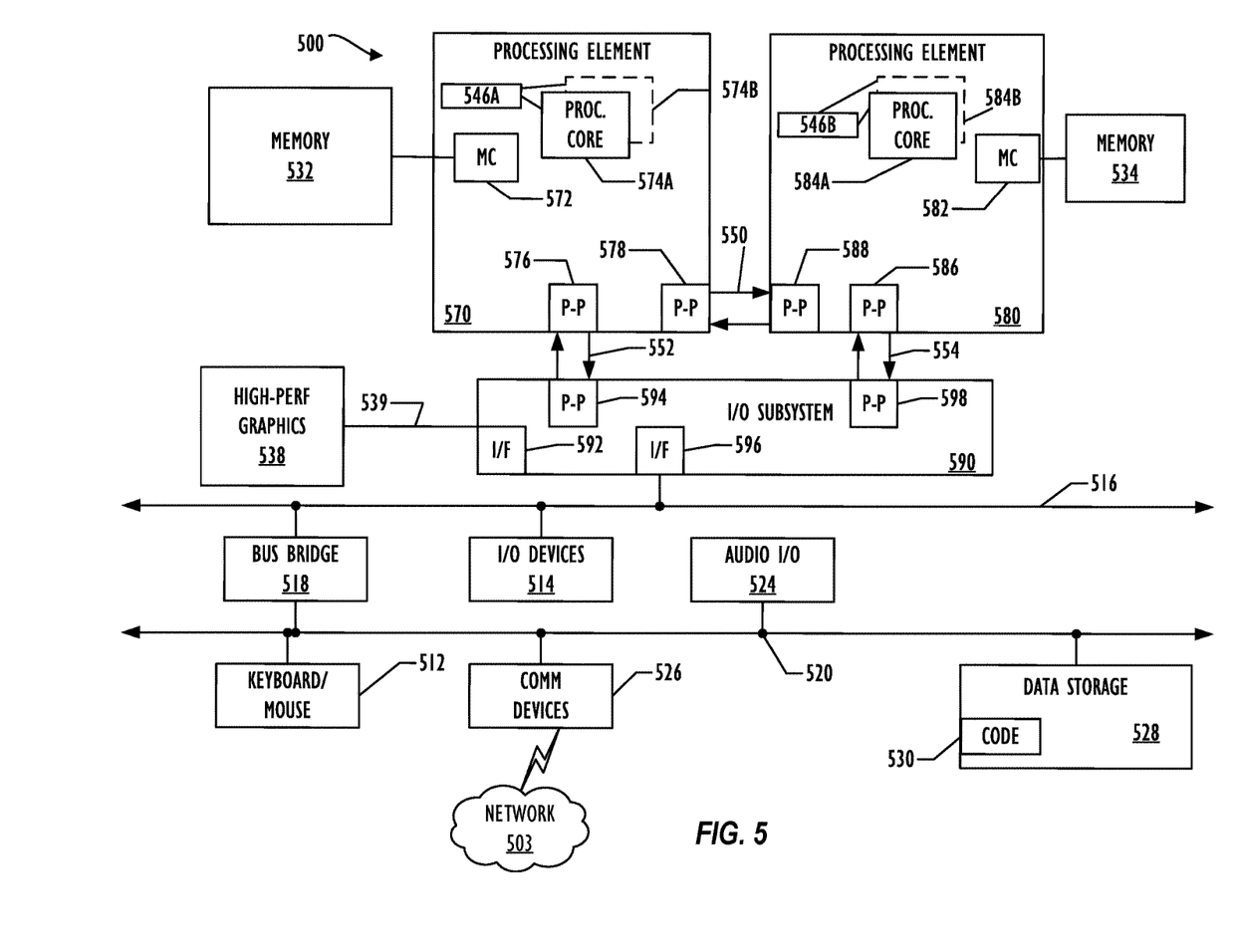
FIG. 5 is a block diagram illustrating an embodiment of a computing device for use with techniques described herein.

Referring now to FIG. 5, a block diagram illustrates a programmable device 500 that may be used for implementing the techniques described herein in accordance with one or more embodiments (e.g., computing system architecture 200, address translation process 300, and method 400. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574*a* and 574*b* and processor cores 584*a* and 584*b*). Such cores 574*a*, 574*b*, 584*a*, 584*b* may be configured to execute computing instruction code. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546*a*, 546*b* may store data (e.g., computing instructions) that are utilized by one or more components of the processing element, such as the cores 574*a*, 574*b* and 584*a*, 584*b*, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 that may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. In addition, the elements of FIG. 5 may alternatively be partitioned using more or fewer integrated chips than illustrated in FIG. 5.

Figure 6:
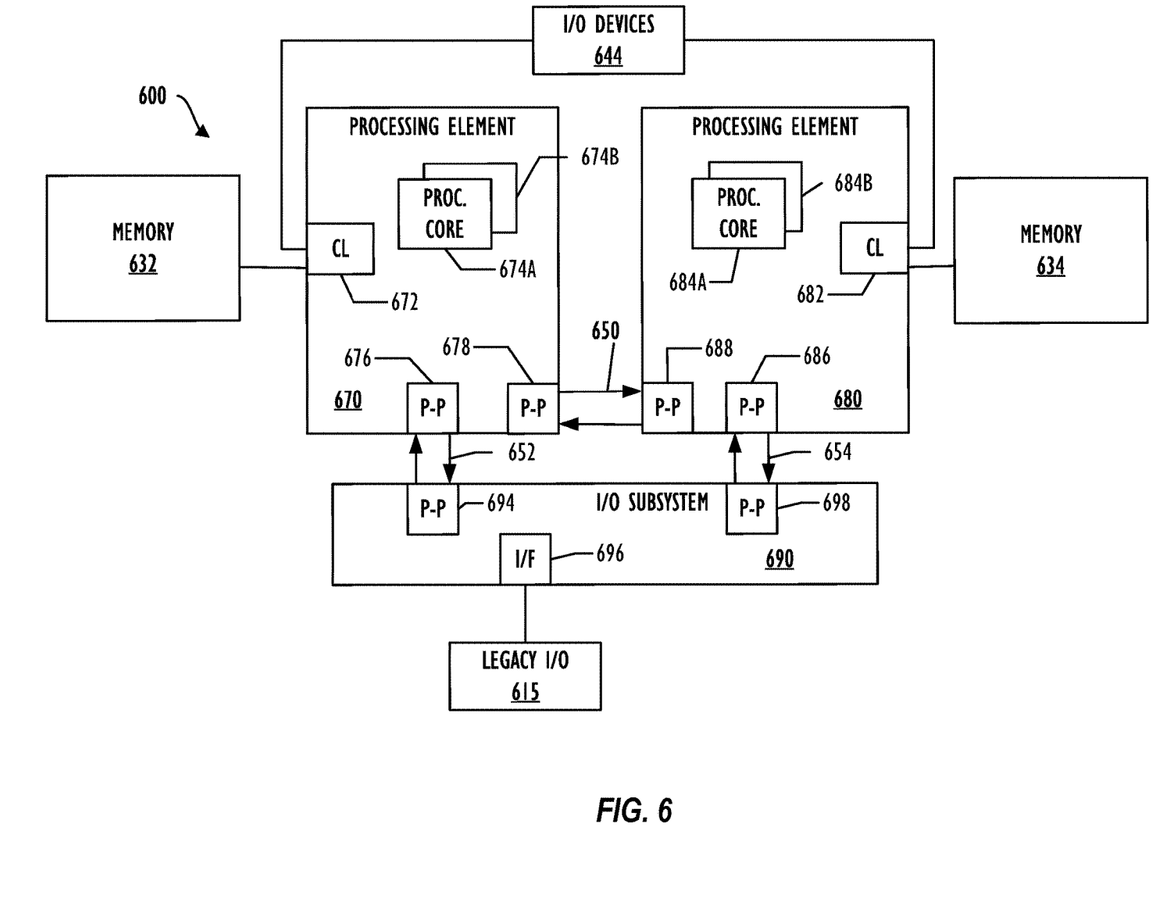
FIG. 6 is a block diagram illustrating another embodiment of computing device for use with techniques described herein.

Referring now to FIG. 6, a block diagram illustrates a programmable device 600 according to another embodiment. Certain aspects of FIG. 6 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices that may be utilized to implement various embodiments discussed herein. Various components of the programmable devices depicted in FIGS. 5 and 6 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

The following examples pertain to further embodiments.

Example 1 is a machine readable medium on which instructions are stored, comprising instructions that when executed cause a machine for providing synchronous processing of designated computing events to: detect a designated computing event using a high priority, low capability routine; create a copy code in an alternate memory space of a first code located in a first memory space; modify the copy code to call for analysis of at least a portion of the copy code that corresponds to the first code; switch execution of the first code with the modified copy code using an address translation data structure that translates a guest memory address to a host memory address after a return of the high priority, low capability routine; and analyze synchronously the at least a portion of the code within the copy code that corresponds to the first code.

In Example 2, the subject matter of Example 1 can optionally include that the designated computing event is a security event that represents a potential harm to the machine.

In Example 3, the subject matter of Example 2 can optionally include instructions, when executed, causes the machine to: determine whether the security event is benign based at least in part on analyzing the at least a portion of the code within the copy code that corresponds to the first code; and resume the first code located in the first memory space based on a determination that the security event is benign.

In Example 4, the subject matter of Example 3 can optionally include instructions, when executed, causes the machine to repair the first code located in the first memory space based at least on a determination that the security event is harmful to the machine.

In Example 5, the subject matter of Example 3 can optionally include instructions, when executed, causes the machine to terminate one or more instructions within the first code based at least on a determination that the security event is harmful to the machine.

In Example 6, the subject matter of Example 1 or Example 2 can optionally include instructions, when executed, cause the machine to replace the first code with the modified copy code using the address translation data structure comprises instructions that cause the machine to enforce the replacement of the first code with the modified copy code for a portion of the first code that caused the designated computing event.

In Example 7, the subject matter of Example 6 can optionally include that the replacement of the first code with the modified copy code is not enforced for other code not related to the designated computing event.

In Example 8, the subject matter of Example 1 or 2 can optionally include that the address translation data structure is adapted to perform a second level address translation that provides hardware-assisted virtualization of the machine.

In Example 9, the subject matter of Example 1 can optionally include instructions, when executed, causes the machine to: execute the high priority, low capability routine such that the high priority, low capability routine interrupts one or more current instructions for a processor; and analyze the at least a portion of the code within the copy code that corresponds to the first code prior to resuming the one or more current instructions for the processor.

In Example 10, the subject matter of Example 1 or 2 can optionally include that the designated computing event is raised in a user mode, and wherein the instructions, when executed causes the machine to analyze the at least a portion of the code within the copy code that corresponds to the first code in a user mode context.

In Example 10, the subject matter of Example 1 or 2 can optionally include that the designated computing event is raised in a kernel mode, and wherein the instructions, when executed causes the machine to analyze the at least a portion of the code within the copy code that corresponds to the first code in a kernel mode context.

Example 12 includes a system for providing synchronous processing of designated computing events, comprising: at least one processor; and a memory, coupled to the at least one processor, and comprises instructions, when executed by the at least one processor causes the system to: detect a designated computing event using a high priority, low capability routine, wherein the high priority, low capability routine interrupts a current process handled by the at least one processor; create a plurality of copy code instructions located in an alternate memory space that copies a plurality of original code instructions located in an original memory space; modify the copy code instructions with a plurality of analysis instructions that call for analysis of at least a portion of the copy code instructions that match the original code instructions; execute the modified copy code instructions by mapping a guest memory address to a host memory address that references the alternate memory space with an address translation data structure; and analyze synchronously at least some of the copy code instructions that were copied from the original code instructions during execution of the modified copy code.

In Example 13, the subject matter of Example 12 can optionally include that the designated computing event is a security event that represents potential malware.

In Example 14, the subject matter of Example 12 or 13 can optionally include instructions that cause the system to execute the modified copy code instructions by mapping the guest memory address to the host memory address that references the alternate memory space with the address translation data structure comprises instructions that cause the system to enforce mapping the guest memory address to the host memory address that references the alternate memory space for the original code instructions that caused the designated computing event.

In Example 15, the subject matter of Example 14 can optionally include that the mapping the guest memory address to the host memory address that references the alternate memory space is not enforced for other code not related to the designated computing event.

In Example 16, the subject matter of Example 12 or 13 can optionally include that the address translation data structure is adapted to perform a second level address translation that provides hardware-assisted virtualization of the system.

In Example 17, the subject matter of Example 12 or 13 can optionally include instructions, when executed by the at least on processor, causes the system to analyze at least some of the copy code instructions that were copied from the original code instructions during execution of the modified copy code prior to resuming the current process for the at least one processor.

Example 18 includes a method for providing synchronous processing of designated computing events, comprising: detecting, using a programmable device, a designated computing event using a high priority, low capability routine, wherein the high priority, low capability routine interrupts one or more instructions currently handled by at least one processor; copying, using a programmable device, an original memory page to create an alternate memory page; modifying, using a programmable device, the alternate memory page such that the alternate memory page calls for further analysis of at least one instruction in the alternate memory page that matches the original memory page; mapping, using the programmable device, a guest memory address to a host memory address that references the alternate memory page with an address translation data structure; and analyzing synchronously, using the programmable device, the at least one instruction in the alternate memory page that matches the original memory page during execution of code in the modified alternate memory page.

In Example 19, the subject matter of Example 18 can optionally include enforcing mapping the guest memory address to the host memory address that references the alternate memory page for instructions within the original memory page that caused the designated computing event.

In Example 20, the subject matter of Example 18 can optionally include that the mapping of the guest memory address to the host memory address that references the alternate memory space is not enforced for other instructions not related to the designated computing event.

In Example 21, the subject matter of Example 18 or 19 can optionally include that the address translation data structure performs a second level address translation that provides hardware-assisted virtualization of the programmable device.

In Example 22, the subject matter of Example 18 can optionally include analyzing the at least one instruction in the alternate memory page that matches the original memory page during execution of code in the modified alternate memory page is performed prior to resuming the one or more instructions currently handled by at least one processor.

Example 23 includes a machine readable medium on which instructions are stored, comprising instructions that when executed cause a machine to: detect a designated computing event using a high priority, low capability routine, wherein the high priority, low capability routine interrupts one or more instructions currently processed by at least one processor; copy an original memory page to create an alternate memory page; modify the alternate memory page such that the alternate memory page calls for further analysis of at least one instruction in the alternate memory page that matches the original memory page; map a guest memory address to a host memory address that references the alternate memory page with an address translation data structure; and analyze synchronously the at least one instruction in the alternate memory page that matches the original memory page during execution of code stored in the modified alternate memory page.

In Example 24, the subject matter of Example claim 23 can optionally include that the mapping of the guest memory address to the host memory address that references the alternate memory page is not enforced for other instructions not related to the designated computing event.

In Example 25, the subject matter of Example claim 23 can optionally include that the address translation data structure is adapted to perform a second level address translation that provides hardware-assisted virtualization of the programmable device.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A non-transitory machine readable medium on which are stored instructions, the stored instructions comprising instructions that when executed cause a machine for providing synchronous processing of designated computing events to:
   detect a designated computing event using a high priority, low capability routine;
   create a copy code in an alternate memory space of a first code located in a first memory space;
   modify the copy code to call for analysis of at least a portion of the copy code that corresponds to the first code;
   update an address translation data structure so that the modified copy code is executed instead of the first code, the address translation data structure configured to translate a guest memory address to a host memory address after a return of the high priority, low capability routine; and
   analyze synchronously the portion of the copy code that corresponds to the first code.

2. The non-transitory machine readable medium of claim 1, wherein the designated computing event is a security event that represents a potential harm to the machine.

3. The non-transitory machine readable medium of claim 2, wherein the instructions, when executed, causes the machine to:
   determine whether security event is benign based at least in part on analyzing the at least a portion of the copy code that corresponds to the first code; and
   resume the first code located in the first memory space based on a determination that the security event is benign.

4. The non-transitory machine readable medium of claim 3, wherein the instructions, when executed, causes the machine to repair the first code located in the first memory space based at least on a determination that the security event is harmful to the machine.

5. The non-transitory machine readable medium of claim 3, wherein the instructions, when executed, causes the machine to terminate one or more instructions within the first code based at least on a determination that the security event is harmful to the machine.

6. The non-transitory machine readable medium of claim 1, wherein the instructions that cause the machine to update the address translation data structure so that the modified copy code is executed instead of the first code comprises instructions that cause the machine to enforce replacement of the first code with the modified copy code for a segment of the first code that caused the designated computing event.

7. The non-transitory machine readable medium of claim 6, wherein the replacement of the first code with the modified copy code is not enforced for other code not related to the designated computing event.

8. The non-transitory machine readable medium of claim 1, wherein the address translation data structure is adapted to perform a second level address translation that provides hardware-assisted virtualization of the machine.

9. The non-transitory machine readable medium of claim 1, wherein the instructions, when executed, causes the machine to:
  execute the high priority, low capability routine such that the high priority, low capability routine interrupts one or more current instructions for a processor; and
  analyze the at least a portion of the copy code that corresponds to the first code prior to resuming the one or more current instructions for the processor.

10. The non-transitory machine readable medium of claim 1, wherein the designated computing event is raised in a user mode, and wherein the instructions, when executed causes the machine to analyze the at least a portion of the copy code that corresponds to the first code in a user mode context.

11. The non-transitory machine readable medium of claim 1, wherein the designated computing event is raised in a kernel mode, and wherein the instructions, when executed causes the machine to analyze the at least a portion of the copy code that corresponds to the first code in a kernel mode context.

12. A system for providing synchronous processing of designated computing events, comprising:
  at least one processor; and
  a memory, coupled to the at least one processor, and comprises instructions, when executed by the at least one processor causes the system to:
    detect a designated computing event using a high priority, low capability routine, wherein the high priority, low capability routine interrupts a current process handled by the at least one processor;
    create a plurality of copy code instructions located in an alternate memory space that copies a plurality of original code instructions located in an original memory space;
    generate modified copy code instructions by adding a plurality of analysis instructions to the plurality of copy code instructions, the plurality of analysis instructions calling for analysis of at least a portion of the plurality of copy code instructions that match the plurality of original code instructions;
    execute the modified copy code instructions by mapping a guest memory address to a host memory address that references the alternate memory space with an address translation data structure; and
    during execution of the modified copy code instructions, analyze synchronously at least some of the plurality of copy code instructions that were copied from the plurality of original code instructions.

13. The system of claim 12, wherein the designated computing event is a security event that represents potential malware.

14. The system of claim 12, wherein the instructions that cause the system to execute the modified copy code instructions by mapping the guest memory address to the host memory address that references the alternate memory space with the address translation data structure comprise instructions that cause the system to enforce mapping the guest memory address to the host memory address that references the alternate memory space for the original code instructions that caused the designated computing event.

15. The system of claim 14, wherein the mapping the guest memory address to the host memory address that references the alternate memory space is not enforced for other code not related to the designated computing event.

16. The system of claim 12, wherein the address translation data structure is adapted to perform a second level address translation that provides hardware-assisted virtualization of the system.

17. The system of claim 12, wherein the instructions, when executed by the at least on processor, causes the system to analyze at least some of the copy code instructions that were copied from the original code instructions during execution of the modified copy code instructions prior to resuming the current process for the at least one processor.

18. A method for providing synchronous processing of designated computing events, comprising:
  detecting, using a programmable device, a designated computing event using a high priority, low capability routine, wherein the high priority, low capability routine interrupts one or more instructions currently handled by at least one processor;
  copying, using the programmable device, an original memory page to create an alternate memory page;
  modifying, using the programmable device, the alternate memory page such that the alternate memory page calls for further analysis of at least one instruction in the alternate memory page that matches the original memory page;
  mapping, using the programmable device, a guest memory address to a host memory address that references the alternate memory page with an address translation data structure;
  executing, using the programmable device, code in the modified alternate memory page; and
  analyzing synchronously, using the programmable device, the at least one instruction in the alternate memory page that matches the original memory page during execution of the code.

19. The method of claim 18, further comprising enforcing, using the programmable device, mapping the guest memory address to the host memory address that references the alternate memory page for instructions within the original memory page that caused the designated computing event.

20. The method of claim 18, wherein the mapping the guest memory address to the host memory address that references the alternate memory page is not enforced for other instructions not related to the designated computing event.

21. The method of claim 18, wherein the address translation data structure performs a second level address translation that provides hardware-assisted virtualization of the programmable device.

22. The method of claim 18, wherein analyzing the at least one instruction in the alternate memory page that matches the original memory page during execution of code in the modified alternate memory page is performed prior to resuming the one or more instructions currently handled by at least one processor.

23. A non-transitory machine readable medium on which instructions are stored, comprising instructions that when executed cause a machine to:

detect a designated computing event using a high priority, low capability routine, wherein the high priority, low capability routine interrupts one or more instructions currently processed by at least one processor;

copy an original memory page to create an alternate memory page;

modify the alternate memory page such that the alternate memory page calls for further analysis of at least one instruction in the alternate memory page that matches the original memory page;

map a guest memory address to a host memory address that references the alternate memory page with an address translation data structure;

execute code in the modified alternate memory page; and analyze synchronously the at least one instruction in the alternate memory page that matches the original memory page during execution of the code.

24. The non-transitory machine readable medium of claim 23, wherein the mapping of the guest memory address to the host memory address that references the alternate memory page is not enforced for other instructions not related to the designated computing event.

25. The non-transitory machine readable medium of claim 23, wherein the address translation data structure is adapted to perform a second level address translation that provides hardware-assisted virtualization of the machine.

* * * * *